Patented Nov. 15, 1932

1,887,792

UNITED STATES PATENT OFFICE

JOSEPH VITAL GHISLAIN VAN DEN DRIESSCHE, OF UCCLE-BRUSSELS, BELGIUM

PROCESS FOR THE MANUFACTURE OF AMORPHOUS CARBON

No Drawing. Application filed January 11, 1932, Serial No. 586,089, and in Belgium January 16, 1931.

This invention relates to a process for manufacturing amorphous carbon similar to the carbon or lampblack known by the name "carbon black" of America, as is used in numerous industries.

The object of the invention is to carry out this manufacture starting with carbon dioxide, and more particularly to utilize for this purpose the by-products obtained in the manufacture of pure hydrogen by the reaction of water gas upon hydrated slaked lime.

In this manufacture, as is well known, the action of the water gas upon the slaked lime brought into the form of granules or porous bodies placed in externally heated retorts results in the production of calcium carbonate and possibly carbonate of iron if ferric oxide was previously added to the lime employed, and it is the custom to treat these by-products under the action of heat so as to regenerate the quicklime and ferrous oxide, and to derive advantage from the carbon dioxide which is liberated. According to the invention, the carbon dioxide thus obtained, or possibly of any other origin, is taken as starting point for the manufacture of amorphous carbon or lampblack, and is first of all converted into a gas ($CO+H_2$) by passing it, together with steam, through iron in a gas-tight retort, so as to produce, independently of the aforesaid gas, oxide of iron capable of being utilized in the preparation of granules of lime, whereupon the gas obtained ($CO+H_2$) is passed, with a fresh quantity of steam, into another gas-tight retort charged with calcium carbide, in which retort under the action of an external source of heat, the calcium carbide is decomposed, with the liberation of hydrogen which is collected separately, into quicklime and pure carbon which may be separated from the lime.

In order to make the invention better understood, an example of its application to the treatment of the by-products of the manufacture of pure hydrogen by means of water gas will be described hereinafter.

As is known, the water gas ($CO+H_2$) utilized in this manufacture must be made in an enclosed vessel, that is to say, in retorts which do not allow any air to enter and which are heated externally, so that, by the passage of steam alone over wood charcoal or coke of any origin, the resulting gas is only composed of hydrogen (about 80%) and carbon monoxide (about 20%). This water gas is afterwards passed into a second group of similar retorts, filled with granules of lime and heated externally. The said granules are preferably made from a paste composed of lime (CaO), ferric oxide ($Fe_2O_3$) and water ($H_2O$). During the passage of the water gas over the said granules, the gas is separated and converted into pure hydrogen, which is collected in a gas holder, calcium carbinate and carbonate of iron, the latter products being formed according to the reaction:

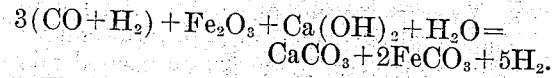
$3(CO+H_2)+Fe_2O_3+Ca(OH)_2+H_2O=$
$CaCO_3+2FeCO_3+5H_2.$

The calcium carbonate ($CaCO_3$) and the carbonate of iron ($FeCO_3$) are then decomposed under the action of heat in order to regenerate the quicklime and ferrous oxide, and to permit the carbon dioxide to be recovered according to the equation:

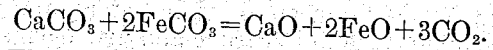
$CaCO_3+2FeCO_3=CaO+2FeO+3CO_2.$

The carbon dioxide thus obtained is then utilized for the manufacture of amorphous carbon or lampblack. For this purpose, it is passed with steam through iron in a third closed retort. The retort being heated to redness, a gas is obtained having the same composition as water gas with the simultaneous production of ferric oxide according to the reaction:

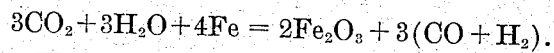
$3CO_2+3H_2O+4Fe = 2Fe_2O_3+3(CO+H_2).$

The ferric oxide is used again in the manufacture of the granules of lime, while the gas, collected in a gas holder, is afterwards sent into a fourth retort charged with calcium carbide ($CaC_2$), provided with a steam inlet and heated to a temperature of about 250° C. The calcium carbide is then decomposed according to the reaction:

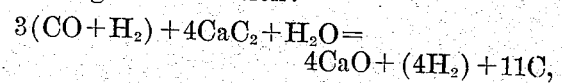
$3(CO+H_2)+4CaC_2+H_2O=$
$4CaO+(4H_2)+11C,$ with the production of hydrogen which is given off and is collected in a gas holder, and the production of quicklime and amorphous carbon.

It will be remarked that steam ($H_2O$) takes part in the foregoing reaction, which steam has the advantage of facilitating the work and the reaction, while increasing the quantity of carbon black and producing an additional quantity of hydrogen.

It is then merely necessary to separate the carbon from the lime in order finally to obtain the desired product. This separation may be effected, for example, by treating the mixture with a solution of hydrochloric acid which absorbs the calcium oxide.

What I claim is:

1. A process for manufacturing amorphous carbon and hydrogen, comprising the steps of causing water gas ($CO+H_2$) and steam to react upon calcium carbide, of heating to about 250° C. in an air tight retort and of separating the lime, carbon and hydrogen obtained.

2. A process for manufacturing amorphous carbon and hydrogen comprising the steps of causing carbon dioxide and steam to pass over iron in a closed retort, of causing the gas ($CO+H_2$) thus obtained to react with steam upon calcium carbide during heating to about 250° C. in an air-tight retort, and of separating the lime, carbon and hydrogen obtained.

3. A process for manufacturing amorphous carbon and hydrogen comprising the steps of causing water gas to react on a heated mixture of slaked lime and ferric oxide, of calcinating the mixture of carbonates obtained, of causing the freed carbon dioxide to pass together with steam over iron in a closed retort, of causing the gas thus obtained to react with steam upon calcium carbide during heating to about 250° C. in an air tight retort, and of separating the lime, carbon and hydrogen obtained.

In testimony whereof I affix my signature.

JOSEPH VITAL GHISLAIN VAN DEN DRIESSCHE.